(12) United States Patent
Stevenson et al.

(10) Patent No.: US 9,181,046 B2
(45) Date of Patent: Nov. 10, 2015

(54) SYSTEM AND METHOD TO SUPPLY A SOLID FEEDSTOCK TO A SOLIDS FEEDER

(71) Applicant: General Electric Company, Schenectady, NY (US)

(72) Inventors: John Saunders Stevenson, Anaheim, CA (US); Anthony Holmes Furman, Scotia, NY (US); Steven Craig Russell, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/705,161

(22) Filed: Dec. 4, 2012

(65) Prior Publication Data

US 2014/0151191 A1  Jun. 5, 2014

(51) Int. Cl.
| | |
|---|---|
| B65G 43/00 | (2006.01) |
| B65G 53/48 | (2006.01) |
| B65G 53/66 | (2006.01) |
| C10J 3/50 | (2006.01) |
| C10J 3/30 | (2006.01) |
| C10J 3/34 | (2006.01) |
| C10J 3/52 | (2006.01) |
| C10J 3/72 | (2006.01) |
| F23K 3/00 | (2006.01) |

(52) U.S. Cl.
CPC ............. *B65G 53/48* (2013.01); *B65G 53/66* (2013.01); *C10J 3/30* (2013.01); *C10J 3/34* (2013.01); *C10J 3/50* (2013.01); *C10J 3/52* (2013.01); *C10J 3/723* (2013.01); *F23K 3/00* (2013.01)

(58) Field of Classification Search
CPC ............ B65G 53/16; B65G 53/48; C10J 3/50
USPC ........................................... 406/52, 53
See application file for complete search history.

(56) References Cited

U.S. PATENT DOCUMENTS

| | | | |
|---|---|---|---|
| 3,841,465 A | 10/1974 | Miller et al. | |
| 3,882,946 A | 5/1975 | Ioannesian et al. | |
| 3,944,380 A | 3/1976 | Kampe | |
| 4,106,533 A * | 8/1978 | Herzig | 141/1 |
| 4,204,955 A | 5/1980 | Armstrong | |

(Continued)

FOREIGN PATENT DOCUMENTS

| | | |
|---|---|---|
| EP | 0256186 A1 | 2/1988 |
| EP | 0343620 A2 | 11/1989 |

(Continued)

OTHER PUBLICATIONS

U.S. Appl. No. 13/705,154, filed Dec. 4, 2012, Thomas Frederick Leininger.

(Continued)

*Primary Examiner* — Gene Crawford
*Assistant Examiner* — Thomas Randazzo
(74) *Attorney, Agent, or Firm* — Fletcher Yoder P.C.

(57) ABSTRACT

In a first embodiment, a system includes a first solids feeder having a first inlet and a first outlet, a second solids feeder having a second inlet and a second outlet, and an adjustable volume coupled to the first outlet and the second inlet. The first solids feeder is configured to supply a feedstock at a first feed rate and the second solids feeder is configured to supply the feedstock at a second feed rate. The adjustable volume is configured to adjust based at least in part on first feed rate and the second feed rate.

20 Claims, 5 Drawing Sheets

(56) References Cited

U.S. PATENT DOCUMENTS

| | | | |
|---|---|---|---|
| 4,236,868 A | 12/1980 | Linhardt | |
| 4,292,991 A | 10/1981 | Wing | |
| 4,472,171 A | 9/1984 | Broderick | |
| 4,666,464 A | 5/1987 | Najjar et al. | |
| 4,668,130 A * | 5/1987 | Sharp | 406/14 |
| 4,828,581 A * | 5/1989 | Feldmann et al. | 48/197 R |
| 5,050,375 A | 9/1991 | Dickinson | |
| 5,051,041 A * | 9/1991 | Firth | 406/99 |
| 5,102,237 A | 4/1992 | Ide | |
| 5,223,144 A | 6/1993 | Woyciesjes et al. | |
| 5,223,199 A | 6/1993 | Ponzielli | |
| 5,356,280 A | 10/1994 | Ponzielli | |
| 5,381,886 A | 1/1995 | Hay | |
| 5,402,876 A | 4/1995 | Hay | |
| 5,657,704 A * | 8/1997 | Schueler | 110/106 |
| 5,753,075 A | 5/1998 | Stromberg et al. | |
| 5,797,332 A * | 8/1998 | Keller et al. | 110/226 |
| 6,640,696 B2 | 11/2003 | Shinobudani et al. | |
| 6,706,199 B2 | 3/2004 | Winter et al. | |
| 7,374,734 B2 | 5/2008 | Grossman et al. | |
| 7,731,783 B2 | 6/2010 | Sprouse et al. | |
| 8,434,641 B2 * | 5/2013 | Coughlin et al. | 221/174 |
| 2001/0032780 A1 | 10/2001 | Winter et al. | |
| 2004/0107700 A1 | 6/2004 | McClanahan et al. | |
| 2008/0145156 A1 | 6/2008 | Livingood et al. | |
| 2009/0107046 A1 | 4/2009 | Leininger et al. | |
| 2009/0178338 A1 | 7/2009 | Leininger et al. | |
| 2009/0217666 A1 | 9/2009 | Farkaly | |
| 2010/0242354 A1 * | 9/2010 | Perkins et al. | 44/639 |
| 2011/0072723 A1 * | 3/2011 | Liu et al. | 48/86 R |
| 2011/0251440 A1 | 10/2011 | Huegle et al. | |
| 2012/0067047 A1 | 3/2012 | Peterson et al. | |
| 2012/0255706 A1 * | 10/2012 | Tadayon et al. | 165/47 |
| 2013/0019530 A1 | 1/2013 | Favilli et al. | |
| 2013/0126002 A1 | 5/2013 | Bathurst | |
| 2013/0327028 A1 | 12/2013 | Steele et al. | |

FOREIGN PATENT DOCUMENTS

| | | |
|---|---|---|
| EP | 0418442 A1 | 3/1991 |
| EP | 0646746 A2 | 4/1995 |
| FR | 2811380 A1 | 1/2002 |
| GB | 1457839 A | 12/1976 |
| RU | 2376493 C2 | 12/2009 |
| RU | 2421612 C1 | 6/2011 |
| WO | 9825027 A1 | 6/1998 |
| WO | 9943954 | 9/1999 |
| WO | 0053924 A2 | 9/2000 |
| WO | 0202935 A1 | 1/2002 |
| WO | 03067082 A1 | 8/2003 |
| WO | 2011121423 A2 | 10/2011 |

OTHER PUBLICATIONS

U.S. Appl. No. 13/705,149, filed Dec. 4, 2012, John Saunders Stevenson.

Perry, Robert H., "Process Machinery Drives: Expansion Turbines," Perry's Chemical Engineers' Handbook, Sixth Edition, 1984, pp. 24-32 thru 24-37.

U.S. Appl. No. 14/103,714, filed Dec. 11, 2013, Hsien-Chin William Yen.

\* cited by examiner

SYSTEM AND METHOD TO SUPPLY A SOLID FEEDSTOCK TO A SOLIDS FEEDER

BACKGROUND OF THE INVENTION

The subject matter disclosed herein relates to solids feeders, such as a system and method for controlling a feedstock supplied to a solids feeder.

A solids feeder is used in a variety of industries to transport a solid feedstock, such as particulate matter. In general, the solids feeder transports the solid feedstock along a path from an inlet to an outlet in a metered quantity. The solids feeder may supply the feedstock at various feed rates to a downstream system. The downstream system may contain gas at high pressure. At the outlet of the solids feeder, the solids feeder may force the feedstock into a solids seal condition, wherein the feedstock reduces backflow of a gas at high pressure. However, the quality of the solid feed output of the first solids feeder may change due to variability of upstream processes. Reduced backflow of gas may be difficult with inconsistent feedstock supply at the solids feeder inlet.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a first solids feeder having a first inlet and a first outlet, a second solids feeder having a second inlet and a second outlet, and an adjustable volume coupled to the first outlet and the second inlet. The first solids feeder is configured to supply a feedstock at a first feed rate and the second solids feeder is configured to supply the feedstock at a second feed rate. The adjustable volume is configured to adjust based at least in part on first feed rate and the second feed rate.

In a second embodiment, a system includes a controller configured to control a first solids feeder or a second solids feeder based at least in part on feedback indicative of a property of an adjustable volume. The adjustable volume is coupled between the first solids feeder and the second solids feeder.

In a third embodiment, a method includes receiving feedback indicative of a property of an adjustable volume coupled between a first solids feeder and a second solids feeder. The method also includes controlling a first solids feeder or a second solids feeder based at least in part on the received feedback.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
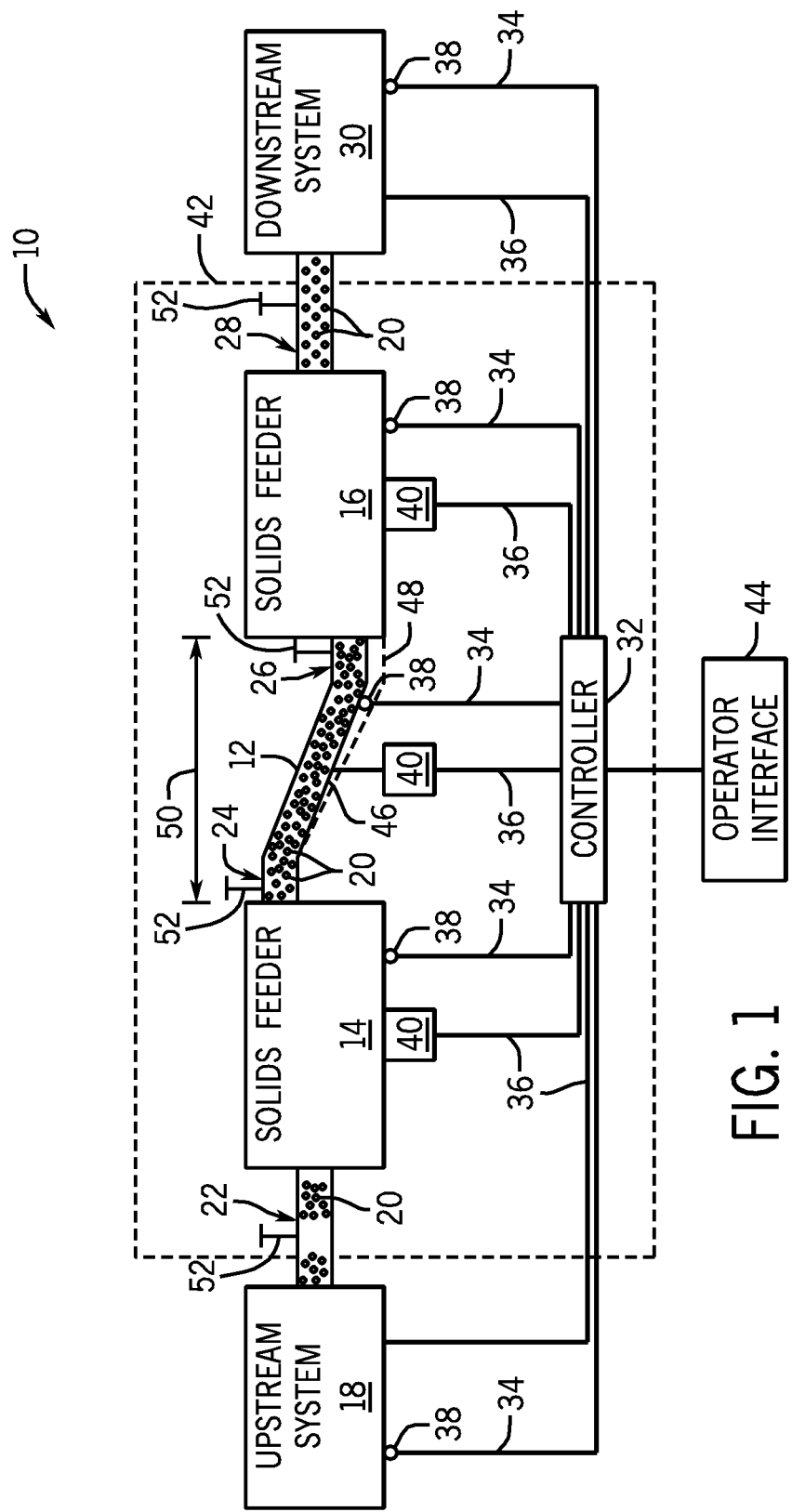
FIG. 1 is a schematic block diagram of an embodiment of a system having an adjustable volume disposed between two solids feeders.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

A feedstock supply system supplies a feedstock to a downstream system via a first solids feeder and a second solids feeder. An adjustable volume is coupled between the first and second solids feeders. The first solids feeder and the adjustable volume may be configured to provide a sufficient supply of feedstock to the second solids feeder to reduce the possibility of starving the second solids feeder. The second solids feeder may be configured to reduce a backflow of gas. The first solids feeder and adjustable volume may reduce inconsistencies in the feedstock supplied to the second solids feeder. The first solids feeder and the adjustable volume may also be configured to provide a desired (e.g., constant) feed rate from the second solids feeder to a downstream system (e.g., gasifier). The first solids feeder may be a booster feeder to enable the second solids feeder to reduce the backflow of gas. The adjustable volume may be adjusted passively or actively based on a property of the feedstock in the adjustable volume, such as a difference in feed rates of the first and second solids feeders, the density of the feedstock, or voids within the feedstock, or combinations thereof. The adjustable volume may adjust to alter the compaction of the feedstock and to reduce wear of the first or second solids feeder. The adjustable volume may be actively or passively controlled to affect the feedstock conveyed to the second solids feeder. The adjustable volume may adjust through expansion or contraction of part of the adjustable volume or through adjustment of the distance between the first outlet of the first solids feeder and the second inlet of the second solids feeder. The feed rate of the first solids feeder and/or the second solids feeder may be based at least in part on a displacement of the adjustable volume from a neutral position. That is, the adjustable volume may control the first solids feeder and/or the second solids feeder. The first and second solids feeders may be the same or different types of solids feeders. The solids feeders may include screw feeders, positive metering pumps, or both. The feedstock supply system may enable a feedstock to be supplied at a low feed rate and high pressure to the downstream system. A solids feeder with a small inlet and a small outlet may be easier to seal against high pressure environments than a solids feeder with a large inlet and a large outlet. A solids feeder with a large inlet and a large outlet may be easier to provide a consistent supply of feedstock without temporary voids or blockages than a solids feeder with a small inlet and a small outlet. Accordingly, a relatively large first solids feeder may provide a consistent and adequate supply of feedstock to a relatively small second solids feeder that may seal against high pressure environments. A controller may adjust the feed rate of the first and second solids feeders based on feedback provided by one or more sensors within the feedstock supply system. Sensors may sense position of the adjustable volume, displacement or distance between the first outlet of the first solids feeder and second inlet of the second solids feeder, load on a solids feeder, density of the feedstock, or voids within the feedstock, or combinations thereof.

Turning to the drawings, FIG. 1 illustrates a block diagram of an embodiment of a system 10 having an adjustable volume 12 coupled to a first solids feeder 14 and a second solids feeder 16. The first solids feeder 14 is coupled to an upstream system 18 (e.g., feedstock preparation system). As described herein, the term upstream may be a direction towards the source of a feedstock 20, while downstream may be in a direction the feedstock 20 flows through the system 10. The first solids feeder 14 is configured to receive feedstock 20 at a first inlet 22. The feedstock 20 may have various compositions including, but not limited to, fuels (e.g., coal), plastics, chemicals, minerals, pharmaceuticals, and/or food products. The first solids feeder 14 conveys the feedstock 20 through to a first outlet 24 coupled to the adjustable volume 12. The feedstock 20 passes through the adjustable volume 12 to a second inlet 26 of the second solids feeder 16. The second solids feeder 16 directs the feedstock through the second outlet 28 to the downstream system 30 (e.g., gasifier). In some embodiments, the system 10 may be a part of a gasification system, in which the feedstock 20 conveyed by the first and second solids feeders 14, 16 is a solid fuel flow (e.g., particulate coal). As discussed in detail below, the second solids feeder 16 may supply the feedstock to the downstream system 30 at a substantially constant second feed rate despite variable feed rates into the first solids feeder 14 and/or the adjustable volume 12.

A controller 32 may be configured to monitor and control the operation of the entire system 10 or components of the system 10 through signal lines 34 and control lines 36. In some embodiments, one or more sensors 38 may be configured to transmit feedback from components of the system 10 to the controller 32 through signal lines 34. Sensors 38 may detect or measure a variety of system and feedstock properties. Sensors 38 may include but are not limited to flow sensors, void sensors, pressure sensors, position sensors, or torque sensors, or combinations thereof. For example, the sensors 38 of the first and second solids feeders 14, 16 may measure the respective first and second feed rates and/or the torque of the first and second solids feeders 14, 16. The sensor 38 on the adjustable volume 12 may measure voids in the adjustable volume, the density of the feedstock 20, or a position of the adjustable volume 12, or combinations thereof.

The controller 32 may control the operation of the components of the system 10 by controlling drive motors 40. Drive motors 40 may drive or actuate the components according to control signals sent via the control lines 36. In an embodiment, each drive motor 40 for the first and second solids feeders 14, 16 may be an electric or hydraulic motor that rotates an auger or screw feeder about an axis or drives a positive metering pump. A drive motor 40 may actuate to actively control the shape and volume of the adjustable volume 12. In some embodiments, the first and second solids feeders 14, 16 may have a common drive motor 40. In other embodiments, the first and second solids feeders 14, 16 have separate drive motors 40. The controller 32 may control the operation of the first and second feeders 14, 16 by adjusting the speed and/or torque of the one or more drive motors 40. The controller 32 may control components of the system 10 based on sensed feedback from the one or more sensors 38. For example, the controller 32 may decrease the first feed rate from the first solids feeder 14 and/or increase the adjustable volume 12 when the first feed rate is greater than a desired second feed rate from the second solids feeder 16. As the second solids feeder 16 directs the feedstock 22 to the downstream system 30, the controller 32 may decrease the adjustable volume 12 to maintain a desired density and sufficient supply of the feedstock 20. The controller 32 may also increase the first feed rate from the first solids feeder 14 and/or decrease the adjustable volume 12 when the first feed rate is less than the desired second feed rate from the second solids feeder 16. The controller 32 may adjust the first feed rate and/or the second feed rate based at least in part on sensed feedback from the adjustable volume 12. The first and second solids feeders 14, 16, the adjustable volume 12, the controller 32, sensors 38, and drive motors 40 may be part of a feedstock supply system 42.

The controller 32 may be coupled to an operator interface 44 configured to receive operator input. Through the operator interface 44, an operator may configure the controller 32 to control how the feedstock supply system 42 conveys the feedstock 20 to the downstream system 30. Operator input received through the operator interface 44 may define acceptable variations in the feed rate to the downstream system, maximum feed rates or operating speeds, minimum feed rates or operating speeds, or adjustable volume parameters, or combinations thereof. For example, the operator may configure the feedstock supply system 42 to convey feedstock to the downstream system 30 within approximately 1%, 5%, or 10% of a desired feed rate. In some embodiments, the operator interface 44 may enable direct control of the system 10 by the operator. For example, inputs received through the operator interface 44 may direct the controller 32 to increase the adjustable volume 12 prior to a temporary interruption (e.g., transition) in the feedstock 20 supplied to the first solids feeder 14 by the upstream system 18, so that the second solids feeder 16 has a sufficient feedstock supply. The operator interface 44 may also display information (e.g., sensor feedback) regarding the operation of the system 10 and/or feedstock supply system 42.

The volume of the adjustable volume 12 between the first and second solids feeders 14, 16 may change during operation. In some embodiments as described above, the volume of the adjustable volume 12 may be actively controlled. In some embodiments, the controller 32 may adjust the volume by moving part of the adjustable volume 12 from a first configuration 46 to a second configuration 48. For example, the controller 32 may adjust a hinged adjustable volume described below via actuating a pneumatic or hydraulic piston coupled to the adjustable volume 12. The controller 32 may also adjust the volume by increasing the distance 50 between the first outlet 24 and the second inlet 26. For example, the controller 32 may retract the shaft of a screw feeder as described below. The adjustable volume 12 may be actively or passively adjustable to maintain the second feed rate at a desired feed rate. For example, in some embodiments, the adjustable volume 12 may be configured to passively adjust, such as by a spring or elastic bladder. The volume and/or position of the adjustable volume 12 may be sensed by a sensor 38 and used by the controller 32 to control the feedstock supply system 42. For example, the controller 32 may use sensed feedback from the adjustable volume to control the position and/or feed rate of the first solids feeder 14 or the second solids feeder 16. For a passively controlled adjustable volume 12, controlling the feed rate of the first solids feeder 14 may also control the adjustable volume 12. In some embodiments, the controller 32 may control the first solids feeder 14 and the adjustable volume 12 to affect the second solids feeder 16, such as to maintain a desired second feed rate to the downstream system 30 or sufficient feedstock for the second solids feeder 16. In some embodiments, the sensors 38 (e.g., void sensors) of the adjustable volume 12 and/or first and second solids feeders 14, 16 are configured to differentiate a plugging condition (e.g., over-compaction) in the adjustable volume 12 from a difference in the first and second feed rates. For example, the sensors 38 may differentiate based at least in part on a force on the adjustable volume 12, the torque of one or both of the first and second solids feeders 14, 16, or a position of the adjustable volume 12, or combinations thereof.

Presently contemplated embodiments of the feedstock supply system 42 may be used to convey the feedstock 20 uniformly (i.e., at a constant rate and with a uniform density) to the downstream system 30 as shown at the second outlet 28. The upstream system 18 may supply the feedstock 20 to the first inlet 22 of the first solids feeder 14 at an inconsistent or variable rate and density. In some embodiments, the controller 32 may actively adjust the operation (e.g., feed rate) of the first solids feeder 14 and the adjustable volume 12 to reduce inconsistencies in the feedstock 20 at the second inlet 26 so that the second solids feeder 16 may convey the feedstock 20 uniformly. In other embodiments, the actively controlled first solids feeder 14 and the passively controlled adjustable volume 12 may reduce inconsistencies in the feedstock 20 at the second inlet 26. The adjustable volume 12 may act as a damper to reduce variations in the second feed rate of feedstock 20 to the downstream system 30.

Some embodiments of the system 10 include a gasification system. Gasification technology can convert hydrocarbon feedstocks, such as coal, biomass, and other carbonaceous feed sources, into a gaseous mixture of carbon monoxide (CO) and hydrogen ($H_2$), i.e., syngas, by reaction with oxygen and steam in a gasifier. These gases may be processed and utilized as fuel, as a source of starting materials for more complex chemicals, for the production of substitute natural gas, or a combination thereof. The system 10 includes an upstream system 18 (e.g., feedstock preparation system) that supplies hydrocarbon (e.g., coal) as a feedstock 20 to the first solids feeder 14. In some embodiments, the upstream system 18 may pelletize, dry, grind, or fluidize the coal to condition the feedstock 20 for input into the feedstock supply system 42 and the downstream system 30 (e.g., gasifier). The upstream system 18 may be controlled by the controller 32. The properties of the coal received by the first solids feeder 14 may vary with the coal at the first input 22 having voids, an inconsistent feed rate, or varying density. As described in detail below, the first solids feeder 14 may be a screw feeder, a positive metering pump, or any mechanical feeding device that enables the feedstock to flow through the system 10.

The first solids feeder 14 conveys the coal at a first feed rate through the adjustable volume 12 to the second solids feeder 16. The second solids feeder 16 conveys the coal from the adjustable volume 12 at a second feed rate. The feed rate of coal into the second solids feeder 16 may be substantially the same as the feed rate out of the second solids feeder 16 into the downstream system 30 at any time. The adjustable volume 12 may adjust based on the difference between the first and second feed rates. In some embodiments where the second feed rate stays constant, the first feed rate and the volume of the adjustable volume 12 may be directly proportional. As the first feed rate increases and the second feed rate stays constant, the volume of the adjustable volume 12 increases up to a maximum. As the first feed rate decreases and the second feed rate stays constant, the volume of the adjustable volume 12 decreases until the adjustable volume reaches a minimum. In these embodiments, the controller 32 may adjust at least the first solids feeder 14 to maintain the adjustable volume 12 within volume limits (e.g., maximum and minimum) and to maintain a sufficient supply of coal for the second solids feeder 16 to supply the coal at the constant second feed rate. For example, the controller 32 may adjust the feed rate of the first solids feeder 14 based on sensed feedback from the adjustable volume 12, such that the adjustable volume is approximately equal to the maximum or minimum. In some embodiments, the first feed rate and the second feed rate may be approximately equal to a desired feed rate. During the operation of the feedstock supply system 42, the first feed rate and the second feed rate are the same average feed rate. Approximately equal feed rates from the first solids feeder 14 and the second solids feeder 16 may substantially maintain the volume of the adjustable volume within volume limits.

The second solids feeder 16 conveys the coal at the second feed rate to the downstream system 30. The downstream system 30 may include a gasifier, a gas turbine, a generator, a reactor, a combustor, a boiler, a furnace, and so forth. The gasifier of a downstream system 30 may be configured to gasify coal to produce syngas and/or another gaseous fuel. This gaseous fuel may be combusted in a gas turbine engine that is in fluid connection with the gasifier. The gas turbine engine may drive an electrical generator to generate electricity. The second feed rate of coal into the gasifier may affect the operation of the gasifier and remainder of the downstream system 30. A substantially constant second feed rate or a slowly changing second feed rate may provide for reliable and stable operation of the gasifier and remainder of the downstream system 30. In some embodiments, stable operation of the downstream system 30 may provide for consistent power generation from the gas turbine and generator. In some embodiments, the controller 32 and adjustable volume 12 may adjust to maintain a low second feed rate. The downstream system 30 may operate at higher pressures than at least the first solids feeder 14 and upstream system 18. The controller 32 may enable the first solids feeder 14 to supply sufficient coal into the adjustable volume 12 to decrease the possibility of high pressure gas from the downstream system 30 backflowing to the first solids feeder 14 or upstream system 18. In some embodiments, the feedstock supply system 42 may be used to isolate the downstream system 30 from the upstream system 18. In some embodiments, one or more valves 52 are configured to vent high pressure gas in the feedstock supply system 42. High pressure gas may backflow through part of the feedstock supply system 42 and vent through one or more of the valves 52. For example, the valves 52 may be disposed at the first inlet 22, the first outlet 24, the second inlet 26, or the second outlet 28.

Figure 2:
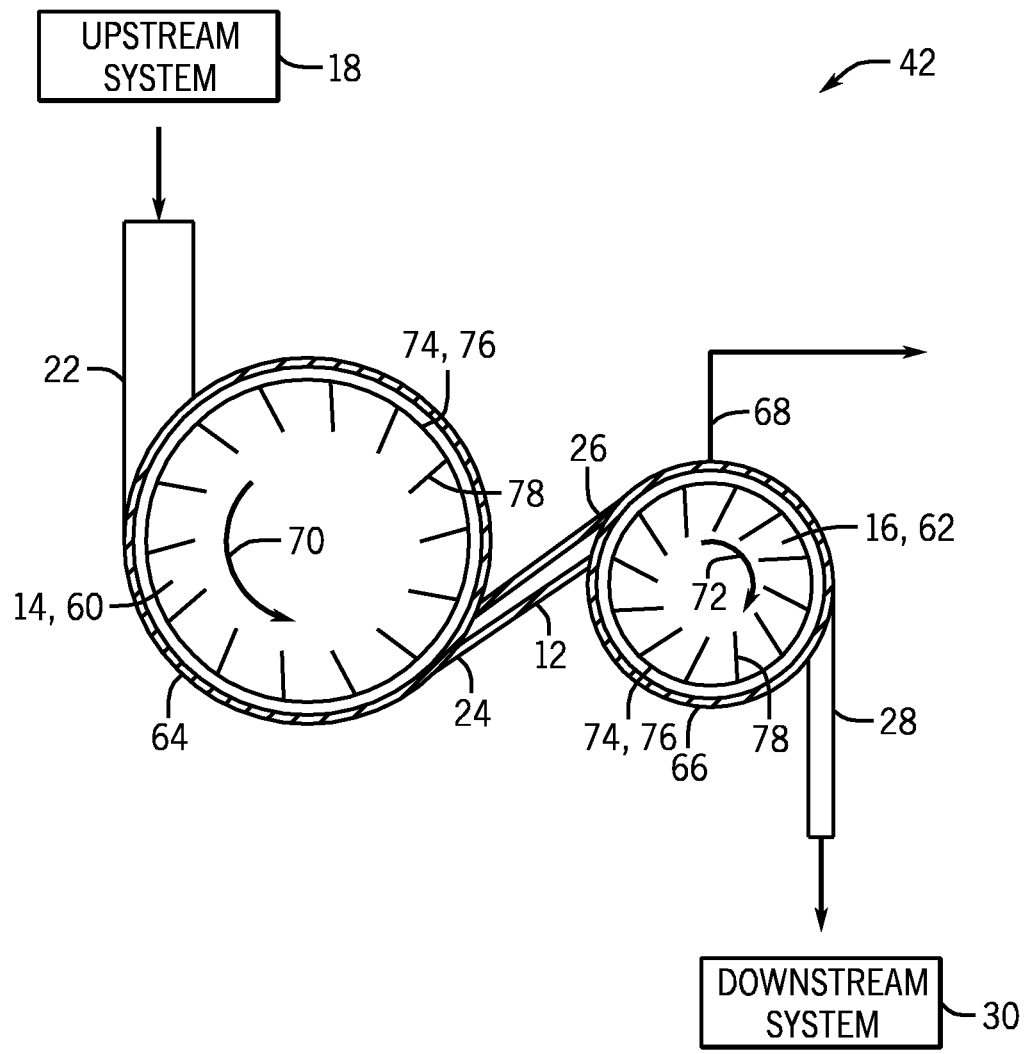
FIG. 2 is a schematic diagram of an embodiment of the adjustable volume and two positive metering pumps.

FIG. 2 illustrates an embodiment of the feedstock supply system 42 in which the first solids feeder 14 is a first positive metering pump 60 and the second solids feeder 16 is a second positive metering pump 62. In some embodiments, the first and second positive metering pumps 60, 62 may be Posimetric® pumps available from General Electric of Schenectady, N.Y. The adjustable volume 12 is coupled between the first outlet 24 and the second inlet 26. The first positive metering pump 60 conveys the feedstock from the first inlet 22 to the adjustable volume 12 at the first outlet 24, and the second positive metering pump conveys the feedstock from the adjustable volume 12 at the second inlet 26 to the second outlet 28. In some embodiments, the first and second positive metering pumps 60, 62 are different sizes and operate at different speeds despite conveying approximately the same amount of feedstock. For example, the first positive metering pump 60 may have a large cross-sectional area and a wider hub 64 yet operate at a slower speed than the second positive metering pump 62 having a smaller cross-sectional area and a narrower hub 66. A larger cross-sectional area and wider hub 64 may reduce the friction resistance of the feedstock in the first positive metering pump 60. In some embodiments, the first feed rate of the larger first positive metering pump 60 may approximate the desired feed rate from the second positive metering pump 62. The adjustable volume 12 may adjust to maintain sufficient feedstock at the second inlet 26 for the second positive metering pump 62 to convey to the downstream system 30. For example, the adjustable volume 12 may expand to accommodate a reserve supply of feedstock at the second inlet 26 so that inconsistencies (e.g., voids) in the feedstock at the first positive metering pump 60 have a diminished effect on the second feed rate. The adjustable volume 12 may contract to reduce voids in the feedstock at the second inlet 26 and expand to reduce over compaction (e.g., high density feedstock). Operating the second positive metering pump 62 at a higher speed may substantially reduce the backflow from the downstream system 30. In some embodiments, a vent 68 on the second positive metering pump 62 may further reduce backflow through the second inlet 26.

The relative orientation of the first and second positive metering pumps 60, 62 may vary among embodiments. In an embodiment as illustrated in FIG. 2, the first and second positive metering pumps 60, 62 may be configured such that the first outlet 24 and second inlet 26 lie in substantially parallel planes. The first positive metering pump 60 may convey feedstock in a first rotational direction 70 and the second positive metering pump may convey feedstock in an opposite second rotational direction 72. In some embodiments, the first rotational direction 70 is the same as the second rotational direction 72. In another embodiment, the first outlet 24 may be substantially perpendicular to the second inlet 26. The first and second positive metering pumps 60, 62 may have a common drive motor or may each be driven separately. Each of the first and second positive metering pumps 60, 62 may include two substantially opposed rotary discs 74, 76 to convey feedstock through the pump. The rotary discs 74, 76 may have grooves or protrusions 78 configured to capture and force the feedstock to move from the inlet (e.g., first inlet 22, second inlet 26) to the outlet (e.g., first outlet 24, second outlet 28).

Figure 3:
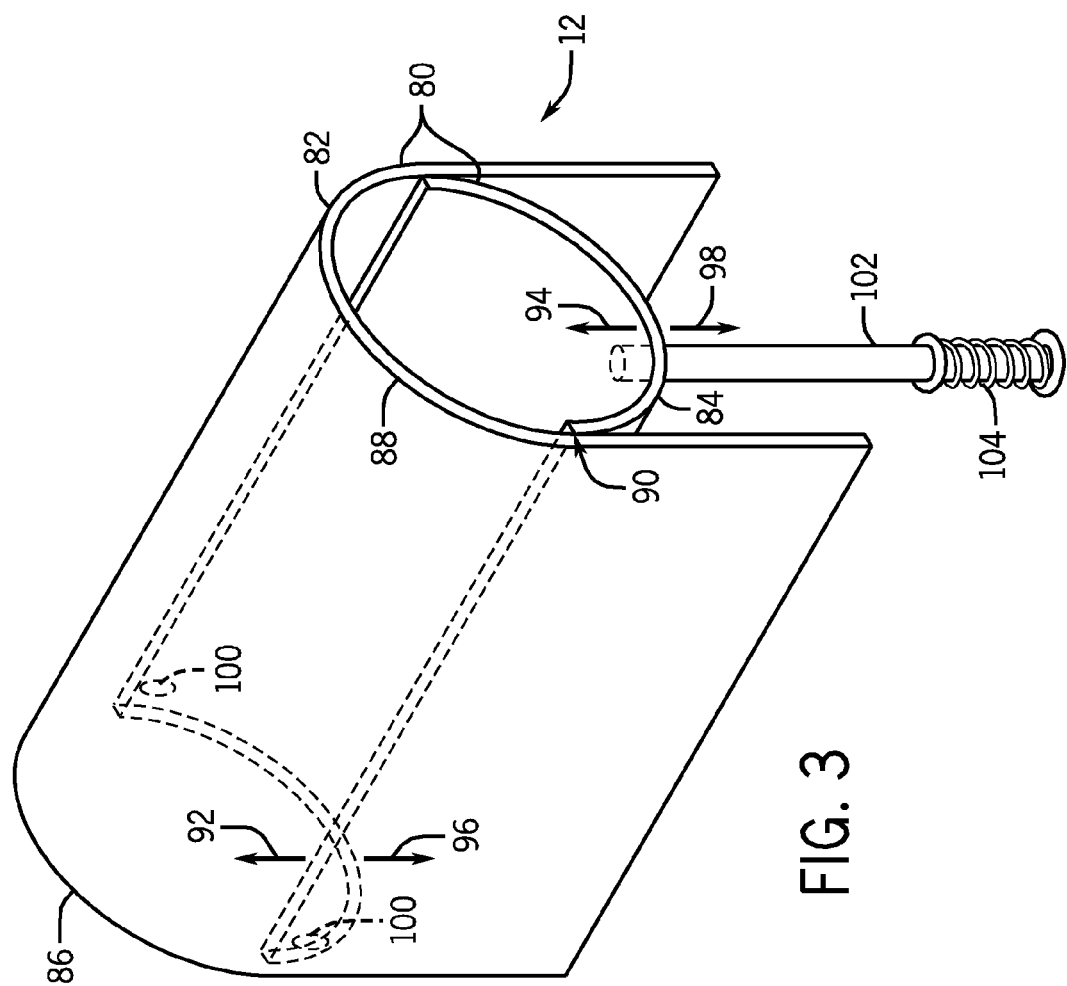
FIG. 3 is a front perspective view of an embodiment of the adjustable volume.

As discussed above, the adjustable volume 12 may be actively or passively controlled. In some embodiments, the adjustable volume 12 may be a conduit 80 having a stationary portion 82 and a movable portion 84 as illustrated in FIG. 3. In other embodiments, the adjustable volume 12 may be a portion of the conduit 80. A first end 86 of the conduit 80 may couple with the first outlet 24 (FIG. 1) and the second end 88 may couple with the second inlet 26 (FIG. 1). The first outlet 24 and/or second inlet 26 may be configured to couple with the variable sizes of the adjustable volume 12. In the illustrated embodiment, the stationary portion 82 is U-shaped and the movable portion 84 is C-shaped or semicircular. Other embodiments of the adjustable volume 12 may include portions having other shapes. For example, an embodiment of the adjustable volume 12 is a telescoping adjustable volume that telescopes to change the volume and distance between the first outlet 24 and the second inlet 26. The interface 90 between the stationary portion 82 and the movable portion 84 may seal the feedstock within the conduit 80. The interface 90 may include seals such as brush seals or pressure isolating seals. In some embodiments, a seal is disposed with the conduit 80 upstream or downstream of the adjustable volume 12. The movable portion 84 may be configured to move within the stationary portion 82 as shown by the arrows 92, 94, 96, 98. In some embodiments, the movable portion 84 may contract along arrows 92, 94 or expand along arrows 96, 98. The first and second ends 86, 88 may expand or contract in different amounts. In some embodiments, such as when the conduit 80 is hinged near an end (e.g., first end 86), only the unhinged end (e.g., second end 88) may expand or contract. The illustrated hinge joint 100 may enable the second end 88 to expand along arrow 98 to increase the adjustable volume 12, or contract along arrow 94 to decrease the adjustable volume 12. In some embodiments, the geometry of the stationary and movable portions 82, 84 and/or the hinge joint 100 may establish a minimum volume or maximum adjustment. In other embodiments, the adjustable volume 12 includes a pinch valve configured to substantially close the conduit 80.

As discussed above, the adjustable volume 12 may be actively or passively controlled. In some embodiments, the movable portion 84 may be coupled to an adjustment member 102. An embodiment with the passively controlled adjustable volume 12 may have a spring 104 coupled to the adjustment member 102. The spring 104 may load movable member 84 so that the feedstock has sufficient density at the second inlet 26. In another embodiment, the adjustment member 102 may be a rod of a fluid actuated adjustment mechanism (e.g., hydraulic or pneumatic piston) or an electrically actuated mechanism (e.g., motor). The first and second positive metering pumps 60, 62 may adjust the first and second feed rates based at least in part on the displacement or load of the adjustment member 102.

Figure 4:
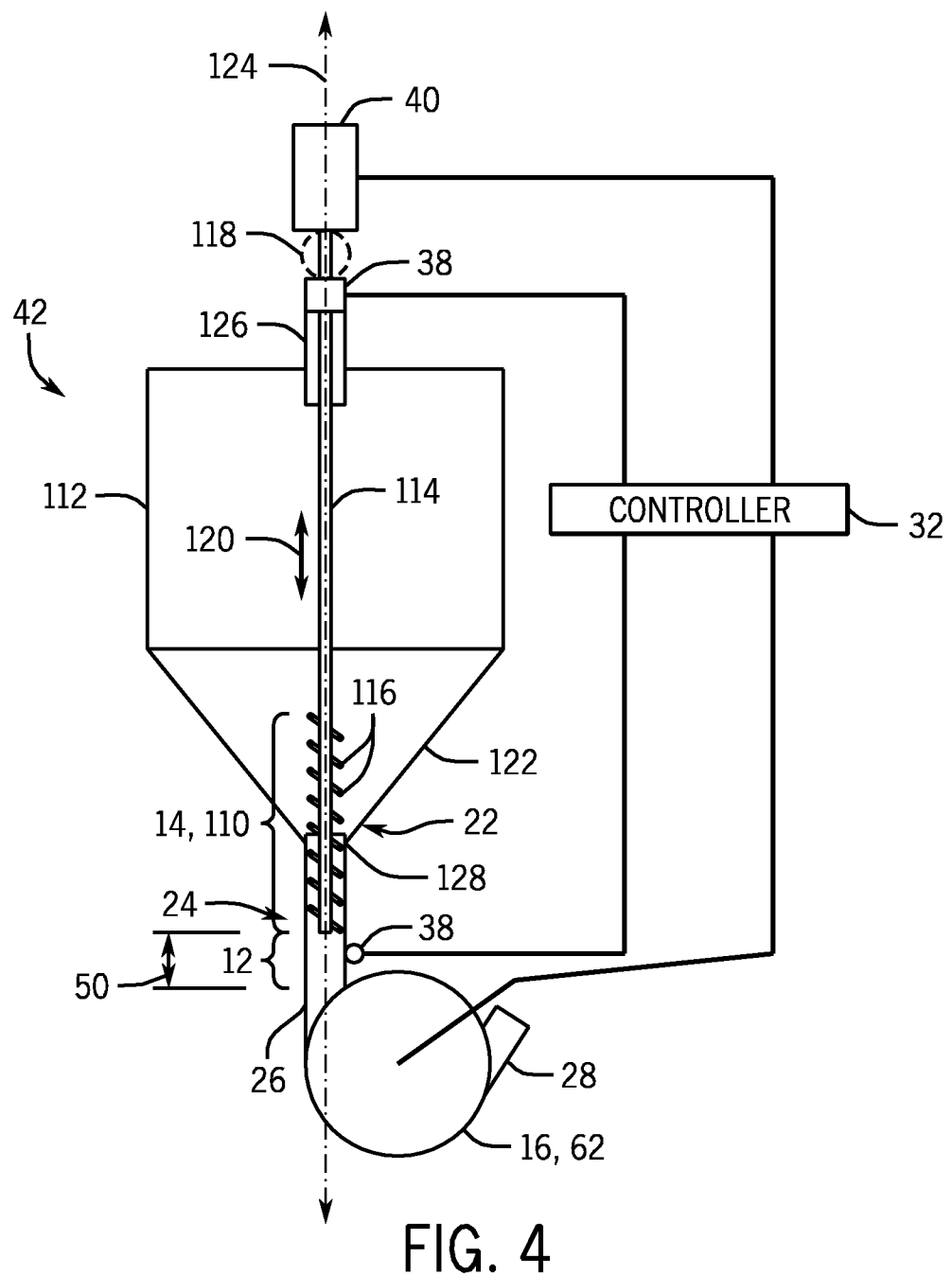
FIG. 4 is a cross-sectional profile view of an embodiment of a screw feeder and the adjustable volume.
Figure 5:
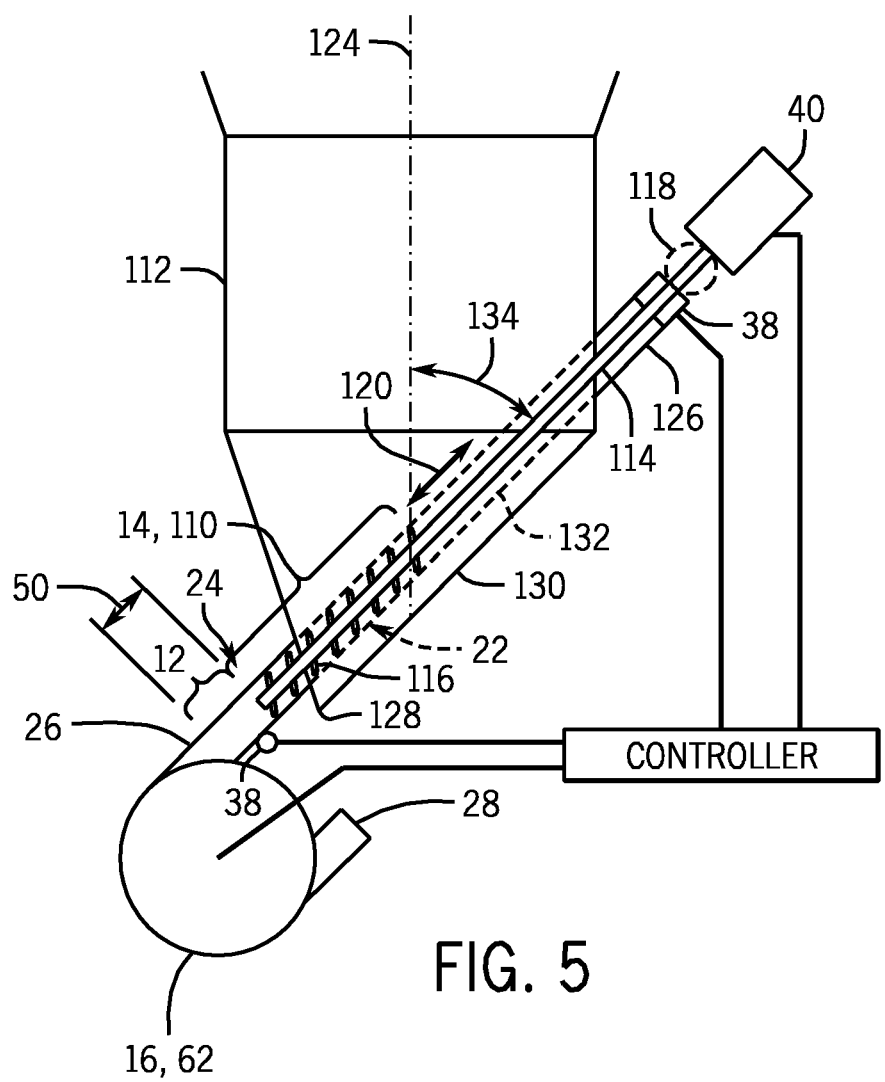
FIG. 5 is a cross-sectional profile view of an embodiment of a screw feeder and the adjustable volume.

The presently contemplated feedstock supply system 42 having the adjustable volume 12 may be embodied in various forms. Different types of solids feeders may be coupled in various combinations to the adjustable volume 12. In addition, the adjustable volume 12 may be adjustable in various manners. FIGS. 4 and 5 illustrate other embodiments of feedstock supply system 42. In these illustrated embodiments, the first solids feeder 14 is a screw feeder. The adjustable volume 12 between the first and second solids feeders 14, 16 may be adjusted by increasing the distance 50 (FIG. 1) between the first solids feeder 14 and the second solids feeder 16. Adjusting the distance 50 between the first solids feeder 14 and the second solids feeder 16 may adjust the first feed rate and/or the second feed rate.

FIG. 4 illustrates an embodiment of the feedstock supply system 42 in which the first solids feeder 14 is a screw feeder 110 and the second solids feeder 16 is the second positive metering pump 62. The screw feeder 110 is within a feed bin 112 that contains the feedstock. A drive motor 40 rotates a shaft 114 with spiraling or helical blades 116 (e.g., screw threads) that convey the feedstock from the first inlet 22 to the first outlet 24. In some embodiments, the drive motor 40 is coupled to the shaft 114 with a slip joint 118 that enables the shaft 114 to travel in the directions shown by arrows 120 to adjust the adjustable volume 12 by changing the distance 50 between the first outlet 24 and the second inlet 26. In the illustrated embodiment, the feed bin 112 has a conical bottom 122 with the shaft 114 along the axis 124 of the feed bin 112. In some embodiments, the feed bin 112 may have a rectangular or other shaped bottom.

In some embodiments, a preload device 126 (e.g., spring, mass) may preload the shaft 114. The preload device 126 may load the shaft 114, blades 116, and feedstock to maintain a desired density level of the feedstock in the adjustable volume 12. In some embodiments, as the quantity of feedstock in the adjustable volume 12 increases, the shaft 114 may axially retract through at least part of a bin outlet 128 via the slip joint 118 while the preload device 126 maintains the preload on the increased feedstock quantity. In some embodiments, as the quantity of feedstock in the adjustable volume decreases, the shaft 114 may axially extend via the slip joint 118 to maintain the preload on the decreased feedstock quantity. Thus, the slip joint 118 and preload device 126 may adjust the adjustable volume 12 by changing the distance 50.

The adjustable volume 12 and solids feeders 110, 16 may adjust based on feedback received from sensors 38 in the feedstock supply system 42. One or more sensors 38 may be disposed in various positions on the feedstock supply system 42. For example, locations of the sensors 38 may include, but are not limited to, locations in the drive motor 40, on the shaft 114 of the screw feeder 110, or in the adjustable volume 12, or combinations thereof. Sensors 38 may sense axial and/or torsion loads on the screw feeder 110, the distance 50 between the first outlet 24 and the second inlet 26, the density of the feedstock, or voids in the feedstock, or combinations thereof.

The controller 32 may adjust the adjustable volume 12, the screw feeder 110, and the second solids feeder 16 in response to received feedback from the one or more sensors 38. The sensed feedback may be used to determine the properties of the adjustable volume 12 such as the quantity, density, and compaction of the feedstock, distance 50, and volume of the adjustable volume 12. The controller 32 may adjust the feed rate of the screw feeder 110 based on the sensed feedback to maintain a sufficient feedstock supply to the second solids feeder 16, where the supplied feedstock has desired properties (e.g., density, compaction, void quantity, void quality). In some embodiments, a sufficient feedstock supply may include reserve feedstock in the adjustable volume 12 such that the feedstock may be readily conveyed by the second solids feeder 16 despite inconsistencies in the supply by the first solids feeder 14. Quantities of feedstock over a maximum limit of the adjustable volume 12 may affect the density or increase the stress on components (e.g., drive motor 40, shaft 114) of the screw feeder 110. Dense feedstock may increase stress on the solids feeders and the adjustable volume 12. Dense feedstock may also be undesirable in the downstream system for some embodiments. In some embodiments, an insufficient feedstock supply below a minimum limit of the adjustable volume 12 may reduce the feedstock density, starve the second solids feeder 16, and/or lead to an inconsistent second feed rate to a downstream system. In some embodiments, the controller 32 may determine the quantity of feedstock in the adjustable volume 12 and/or the volume of the adjustable volume 12 through the feedback of sensed changes in the distance 50, changes in the torque and/or load on the shaft 114, or changes in voids or density of the feedstock.

The controller 32 may actively adjust the screw feeder 110 and/or the adjustable volume 12 to provide feedstock at a first feed rate that is approximately the same as the second feed rate. In some embodiments, the controller 32 may control the adjustable volume 12 by controlling the first solids feeder 14 (e.g., screw feeder 110). For example, the adjustable volume 12 and the distance 50 may be based at least in part on the first feed rate of the screw feeder 110, quantity and volume of feedstock in the adjustable volume 12. In an embodiment where the first feed rate of the screw feeder 110 is less than the second feed rate of the second solids feeder 16 (e.g., second positive metering pump 62), the adjustable volume 12 may decrease as the quantity and volume of feedstock conveyed by the second solids feeder 16 decreases. This may decrease the distance 50 as the preload device 122 maintains the load on the decreasing quantity and volume of feedstock. Thus, the adjustable volume 12 is configured to adjust based at least in part on the first feed rate and the second feed rate. The first feed rate and/or the second feed rate are to adjust based at least in part on the adjustable volume 12. The controller 32 may increase the first feed rate to substantially the same or greater than the second feed rate to maintain or increase the adjustable volume 12 and quantity of feedstock therein. The increased feedstock quantity may increase the distance 50 as the shaft 114 retracts along the arrows 120. Thus, the controller 32 is configured to control the position and feed rate of the screw feeder 110 based at least in part on feedback indicative of a property (e.g., feedstock quantity, volume) of the adjustable volume 12.

In some embodiments, the adjustable volume 12 and first solids feeder 14 (e.g., screw feeder 110) may be adjusted based on the sensed axial loads, torsion loads, voids or density of the feedstock. In an embodiment, low axial or torsion loads on the shaft 114 may indicate low feedstock quantity in the adjustable volume 12. The controller 32 may increase the first feed rate based on the sensed low loads to increase the adjustable volume 12. Conversely, high axial or torsion loads on the shaft may indicate high feedstock quantity or volume in the adjustable volume 12 so that upon sensing the high sensed loads, the controller 32 may decrease the first feed rate and thus decrease the adjustable volume 12. Sensed voids in the feedstock may indicate insufficient feedstock supply, whereas sensed compaction (e.g., high density) or too few voids may indicate surplus feedstock. The controller 32 may adjust the first feed rate based on the sensed voids or density to adjust the adjustable volume 12. In some embodiments, the controller 32 may adjust the first feed rate based on the distance 50, axial loads, torsion loads, voids and the density of the feedstock supplied to the second solids feeder.

In some embodiments, the screw feeder 110 may not have a slip joint 118. The controller 32 may adjust the first feed rate based on sensed feedback from load (e.g., axial, torque) and/or void sensors. In these embodiments, the controller 32 may adjust the first feed rate as described above, however the shaft 114 may not travel along arrows 120. The adjustable volume 12 may be one of the adjustable volumes 12 described above with FIGS. 2 and 3 in which the distance 50 is static.

FIG. 5 illustrates another embodiment of the feedstock supply system 42 in which the first solids feeder 14 is a screw feeder 110 and the second solids feeder 16 is the second positive metering pump 62. The screw feeder 110 is within a feed bin 112 having a sloped bottom 130 with a channel 132 for the shaft 114. The channel 132 may aid the conveyance and mixing of feedstock within the feed bin 112 through the bin outlet 128. In the illustrated embodiment, the shaft 114 is not parallel with the axis 124 of the bin 112, but rather the shaft 114 of the screw feeder 110 is sloped similar to the sloped bottom 130. The shaft 114 may disposed at an angle 134 with the axis 124 between approximately 0° to 90°, 5° to 60°, 10° to 45°, or 15° to 30°, or any angle therein. The slip joint 118, preload device 126, sensors 38, and controller 32 of the illustrated embodiment may be similar to those described above with FIG. 4.

Presently contemplated embodiments include a method of receiving feedback indicative of a property of the adjustable volume and controlling the first and/or second solids feeders based on the received feedback. The properties of the adjustable volume may include the distance between the first and second solids feeders, the volume of the adjustable volume, the quantity of feedstock in the adjustable volume, the density of the feedstock, or voids in the feedstock, or combinations thereof. Controlling the first and second solids feeders may include controlling the feed rates or controlling the distance between the first and second solids feeders. In some embodiments, the method may include controlling the adjustable volume based on the first feed rate and the second feed rate. Controlling the adjustable volume may be active or passive based on the system. In some embodiments, the adjustable volume may be adjusted independently of the feed rates. Controlling the first solids feeder and the adjustable volume may affect the second feed rate so that it may be maintained at a desired feed rate. The method may include supplying the feedstock to a downstream system (e.g., gasifier).

Technical effects of the invention include utilizing an adjustable volume disposed between two solids feeders to adjust so that the downstream solids feeder may output a consistent feedstock and/or feedstock at a consistent feed rate. The adjustable volume may expand and contract to maintain sufficient feedstock at the second inlet of the second solids feeder so that the second feed rate may be steady and uniform despite inconsistencies in the feedstock supply upstream of the second solids feeder. The adjustable volume may be actively or passively controlled. Properties of the adjustable volume and the feedstock within the adjustable volume may affect the first and/or second feed rates. In some embodiments, the first and second feed rates may be approximately the same at any time despite that the solids feeders may be of different types and sizes. During the operation of the feedstock supply system 42, the first and second feed rates are the same average feed rate to maintain the average feed rate through the feedstock supply system. A large volume, slow-speed solids feeder may be able to convey a feedstock at the same rate as a small volume, high-speed solids feeder. The large volume solids feeder may be robust such that an inconsistent feedstock supply at the first inlet may have a small affect on the operability and first feed rate. The small volume solids feeder may be less robust to inconsistent feedstock supply and have a low backflow rate. The large volume solids feeder may be larger than the small volume solids feeder by a factor of approximately 1.5, 2, 3, 4, 5, or more. The adjustable volume between the large volume and small volume solids feeders with approximately the same feed rate may increase the steadiness and uniformity of the feedstock supplied by the second solids feeder. The adjustable volume may be a damper to reduce the effect of changes the feedstock or feed rate from the first solids feeder may have on the second solids feeder. This may increase the reliability of the feedstock supply system and may lead to decreased possibility of shutdown of downstream systems. The feedstock supply system may enable a feedstock to be supplied at a low feed rate and high pressure to the downstream system. Presently contemplated embodiments may also reduce the consumption of purge gas to clear blockages. Smaller inlets and smaller second solids feeders may be utilized because the adjustable volume improves the consistency of the feedstock supply into the second solids feeder. This may increase the potential range of applications in which the solids feeders may be used.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a first solids feeder comprising a first inlet and a first outlet;
a second solids feeder comprising a second inlet and a second outlet; and
an adjustable volume coupled to the first outlet and the second inlet, wherein the first solids feeder is configured to supply a feedstock at a first feed rate to the adjustable volume, the second solids feeder is configured to continuously receive the feedstock from the adjustable volume, the second solids feeder is configured to supply the feedstock at a second feed rate, and the adjustable volume is configured to adjust based at least in part on the first feed rate and the second feed rate.

2. The system of claim 1, wherein the first solids feeder is a screw feeder.

3. The system of claim 2, wherein the second solids feeder is a positive metering pump.

4. The system of claim 1, wherein the first solids feeder and the second solids feeder are positive metering pumps.

5. The system of claim 1, wherein the adjustable volume is configured to passively adjust.

6. The system of claim 1, wherein the adjustable volume is configured to adjust to maintain the second feed rate at a desired feed rate.

7. The system of claim 1, comprising a controller, wherein the controller is configured to control at least one of the first solids feeder or the second solids feeder.

8. The system of claim 7, wherein the controller is configured to control the adjustable volume.

9. The system of claim 7, comprising at least one sensor, wherein the controller is configured to control the first solids feeder based at least in part on feedback received from the at least one sensor, and the feedback received from the at least one sensor is indicative of a position of the first outlet relative to the second inlet, a volume of the adjustable volume, or a density of the feedstock, or any combination thereof.

10. The system of claim 1, comprising a gasifier coupled to the second outlet, wherein the gasifier is configured to gasify the feedstock.

11. A system, comprising:
a controller configured to control a first solids feeder or a second solids feeder based at least in part on feedback indicative of a property of an adjustable volume coupled between the first solids feeder and the second solids feeder, wherein the second solids feeder is configured to continuously receive a feedstock from the adjustable volume.

12. The system of claim 11, wherein the controller is configured to control a first feed rate of the first solids feeder.

13. The system of claim 12, wherein the controller is configured to control the first feed rate of the first solids feeder relative to a second feed rate of the second solids feeder.

14. The system of claim 11, comprising the adjustable volume, wherein the controller is configured to control the adjustable volume.

15. The system of claim 14, comprising the first solids feeder configured to supply the feedstock to the adjustable volume.

16. The system of claim 15, comprising the second solids feeder configured to receive the feedstock from the adjustable volume.

17. A method, comprising:
   receiving feedback indicative of a property of an adjustable volume coupled between a first solids feeder and a second solids feeder, wherein the second solids feeder is configured to continuously receive a feedstock from the adjustable volume; and
   controlling a first solids feeder or a second solids feeder based at least in part on the received feedback.

18. The method of claim 17, wherein the property of the adjustable volume comprises a position of an outlet of the first solids feeder relative to an inlet of the second solids feeder, a volume of the adjustable volume, a density of the feedstock, or any combination thereof.

19. The method of claim 17, comprising controlling a size of the adjustable volume based at least in part on a first feed rate of the first solids feeder and a second feed rate of the second solids feeder.

20. The method of claim 17, comprising controlling a speed of the first solids feeder to maintain a second feed rate of the second solids feeder at a desired feed rate.

* * * * *